United States Patent [19]

Boeckmann

[11] Patent Number: 4,518,829

[45] Date of Patent: May 21, 1985

[54] TWO TERMINAL MICROPHONE ACTIVE LOAD GAIN REGULATION CIRCUIT

[75] Inventor: Eduard F. B. Boeckmann, Huntsville, Ala.

[73] Assignee: GTE Communications Systems Corporation, Northlake, Ill.

[21] Appl. No.: 596,179

[22] Filed: Apr. 2, 1984

[51] Int. Cl.³ .............................................. H04M 1/60
[52] U.S. Cl. ................................. 179/81 B; 179/16 F; 381/113
[58] Field of Search ................. 179/81 B, 81 R, 16 F; 381/113, 122, 111

[56] References Cited

U.S. PATENT DOCUMENTS 3,748,400  7/1973  Ritz et al. ...................... 179/16 F X
4,394,542  7/1983  Hara et al. ........................ 179/81 B Primary Examiner—Gene Z. Rubinson
Assistant Examiner—James L. Dwyer
Attorney, Agent, or Firm—Robert J. Black; Gregory C. Hendricks

[57] ABSTRACT

An electret microphone gain regulation circuit employing an active load for use in high quality telephone instruments or handsets where two terminal electret microphones of the current source type are employed. The circuitry provides a heavier load on short loops and a lighter load on long loops to regulate the signal level at its output.

8 Claims, 1 Drawing Figure

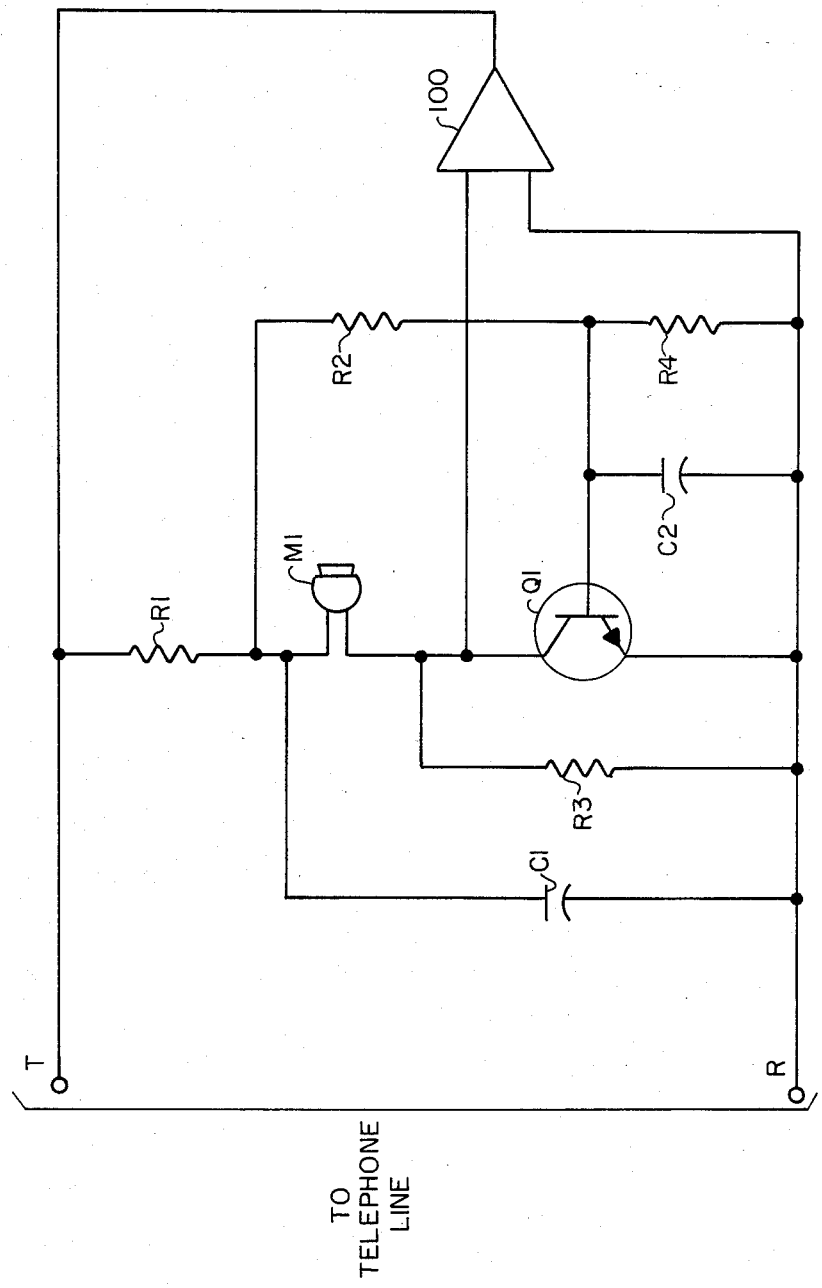

TWO TERMINAL MICROPHONE ACTIVE LOAD GAIN REGULATION CIRCUIT

BACKGROUND OF THE INVENTION

1. Technical Field:

The present invention relates to microphones of the current source type where a resistive load is normally used to convert the signal into a voltage source for further amplification and more particularly to subscriber's telephone instruments employing two terminal electret microphones of the current source type which may be employed in long or short loop telephone environments.

2. Background Art:

Since the advent of the electronic telephone and particularly since the usage of the electret microphone has become common in such electronic telephones, various circuits have been devised to provide proper amplification for the electret microphone. Many of the circuits available have one disadvantage or another such as poor frequency response, limited range of supply voltage, tendency to acoustic feedback "singing," susceptibility to radio frequency interference and incorrect impedance or current supervision properties. Some of the circuits attempt to use a minimum of components using only a single resistor for load to reduce costs, but performance frequently suffers as a result.

Many current generation high quality but low cost telephones have been developed for the business and residential telephone subscriber. Quite frequently these units employ telephone transmitters of low output that require substantial amplification of voice signals as picked up by the telephone transmitter. Often these telephone transmitters are of the electret type with an associated built in amplifier, pre-amplifier or buffer amplifier included in the handset or hand held telephone unit in which the telephone transmitter is mounted. The associated receiver also included in the same telephone handset or telephone unit is usually a standard magnetic receiver and may or may not be driven by an associated amplifier. In such telephones the voice network may be located in the handset (hand held unit) or may be located in the associated telephone base. This network may be of the traditional coupled coil type or of the more recently employed integrated circuit variety.

Most of these telephones have not taken into account the hazard of feedback seen under certain sound reflective conditions, where output from the handset receiver may be picked up by the microphone and utilized to reinforce the output of the receiver because of the normal side tone available in the voice network. This results in the condition referred to as "singing." "Singing" is defined as an isolation that occurs usually in the frequency range of from 2,000 to 3,000 Hz and is audible without holding the telephone receiver close to the subscriber's ear. This condition typically occurs only under extreme conditions when the handset is placed downward or in a reflective corner environment forming a type of resident cavity around the microphone and the receiver.

Most previous designs have been found to have this loud and objectionable singing under certain conditions which could be transmitted over the telephone line of the other party. Most early attempts to solve the problem resulted in a reduction in the transmit gain and loss of low frequency as well as high frequency signals. Obviously such signal reduction is not desirable particularly if the transmitter is to be used on anything other than a short loop environment. One method used to stop the singing involved uses a feedback loop from the output of the telephone transmitter amplifier back to its input. This particular technique because of the degradation present in feedback arrangements results in substantial loss in transmit level.

SUMMARY OF THE INVENTION

The circuitry of the present invention employs an NPN transistor, three resistors and a capacitor to provide an active direct current load for a two terminal electret microphone. The electret microphone itself is powered through a resistor as usual from the telephone line, usually through a polarity guard and protective device. A filter capacitor from the positive terminal to the circuit, eliminates alternating current signals at its input power terminal in the usual application. The negative terminal is connected to the collector of the NPN transistor and a current bypass resistor is placed in parallel with the transistor. The parallel resistor and transistor form the active load for the microphone. Bias voltage for the transistor is obtained from the same point as the positive supply for the microphone, taking advantage of the filter capacitor at that point to prevent feedback. The base of the transistor has a filter capacitor to the common ground to prevent alternating current gain to occur in the transistor of other certain low cut-off frequency determined by the value of components in the circuit which act as a low pass filter with a single pole.

In operation on short telephone loops of 1,000 feet or less telephone line between the instrument and the central office, the transistor is turned on sufficiently to provide a heavier load on the microphone thereby reducing gain. On longer loops which are 15,000 feet or greater of telephone line, the transistor is closer to an off state thereby reducing the load on the microphone and increasing the circuit gain. With a proper selection of component values no clipping or feedback distortion occurs.

The end result of the proposed circuitry is that transmit gain is regulated between short loops and long loops and feedback singing tendency is reduced on short loops by the inherent gain reduction of the circuit under short loop conditions. On long loops the gain is increased to compensate for the loop loss. The circuit also provides protection from generation of high noise levels on short loop high battery voltage conditions where the microphone could otherwise become a noise generator. Feedback singing is made unlikely because gains reduced on short loop where the singing usually occurs. The capacitors in the circuit also help by reducing positive feedback.

BRIEF DESCRIPTION OF THE DRAWING

The single sheet of accompanying drawings shows a simplified schematic of a two terminal microphone active load gain regulation circuit in accordance with the present invention.

DESCRIPTION OF THE PREFERRED EMBODIMENT

Referring now to the accompanying drawing, it should be noted that the conventional telephone circuitry such as polarity guard, voice network dialing and ringing circuitry and various protective devices have not been shown for purposes of simplicity and in as much as they do not form a portion of the present invention. As shown the circuit of the present invention is connected between the + and − lines (T and R) which are in analogous to the tip and ring signal and voltage lines of a conventional telephone loop. The two terminal microphone MI is of the electret current source type. It is provided a source of power from the telephone line through resistor R1 and decoupled by filter capacitor C1. Transistor Q1 and resistor R3 provide the load for the microphone. Resistors R2 and R4 provide bias voltage for transistor Q1, which is also filtered by capacitors C1 and C2. The microphone signal is routed to amplifier AMP which may be any number of different types of amplifiers depending on the amplification requirement. The details of the amplifier circuitry do not form a portion of the present invention, and accordingly they have not been shown.

In operation audio signals picked up by the microphone are employed to modulate the current flow through load resistor R3 and transistor Q1. When the telephone loop is short, for example 1,000 feet or less, the bias voltage for transistor Q1 will be quite high and the transistor will shunt resistor R3 causing a lower signal to be developed to the input of amplifier AMP. When the telephone loop is long, the bias is reduced for transistor Q1 and resistor R3 is shunted less by transistor Q1 causing a much larger signal to appear at the input of amplifier AMP. Therefore, it may be seen that signal is regulated by the action of transistor Q1. Capacitor C2 prevents feedback of signal into the base of transistor Q1 which would otherwise cause improper operation. Also bias for transistor Q1 comes from the filtered microphone power source, filtered by capacitor C1 which also improves decoupling for transistor Q1. Resistor R3 provides a current bypass and ensures a minimum load on the microphone. Resistor R3 also lowers noise generation under high voltage short loop conditions.

In the present invention an active transistor load for a two terminal electret microphone provides thus a regulated signal over a wide range of telephone line conditions for high quality telephone voice transmission. However, it will be obvious to those skilled in the art that numerous modifications may be made to the present design without departing from the spirit of the present invention which shall be limited only by the scope of the claims appended hereto.

What is claimed is:

1. A gain regulation circuit employing an active load for an electret microphone included in a subscriber telephone instrument connected to a telephone line extending to a central switching point and including a power source thereat connected to said telephone line, said regulation circuit comprising:
   an active load circuit connected in series with said electret microphone across said telephone line;
   bias means for said active load circuit connected across said telephone line and including a circuit connection to said active load circuit;
   an amplifier means including an input connected to the junction between said electret microphone and said active load circuit, and an output connected to said telephone line.

2. A gain regulation circuit as claimed in claim 1, wherein: said active load circuit comprises a transistor including collector-emitter and base electrodes and a first resistor connected in parallel with said transistor collector-emitter path.

3. A gain regulation circuit as claimed in claim 1, wherein: said bias means comprises a voltage divider connected across said telephone line.

4. A gain regulation circuit as claimed in claim 3, wherein: said voltage divider comprises first and second resistors serially connected with the junction therebetween connected to said active load circuit.

5. A gain regulation circuit as claimed in claim 2, wherein: there is further included low pass filter means connected between said active load circuit and said telephone line.

6. A gain regulation circuit as claimed in claim 5, wherein: said low pass filter means comprises a capacitor.

7. A gain regulation circuit as claimed in claim 1, wherein: there is further included alternating current signal blocking means connected in parallel with the serial connection of said active load circuit and said electret microphone.

8. A gain regulation circuit as claimed in claim 7, wherein: said alternating current blocking means comprises a capacitor.

* * * * *